US007685152B2

(12) United States Patent
Chivukula et al.

(10) Patent No.: US 7,685,152 B2
(45) Date of Patent: Mar. 23, 2010

(54) METHOD AND APPARATUS FOR LOADING DATA FROM A SPREADSHEET TO A RELATIONAL DATABASE TABLE

(75) Inventors: Balakrishna Chivukula, Bethel, CT (US); Kuppayi K. Rajendran, Naugatuck, CT (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 11/330,211

(22) Filed: Jan. 10, 2006

(65) Prior Publication Data
US 2007/0162504 A1 Jul. 12, 2007

(51) Int. Cl.
G06F 17/00 (2006.01)
(52) U.S. Cl. ...................................................... 707/102
(58) Field of Classification Search ............... 707/104.1, 707/10, 100, 509, 4; 715/503, 763
See application file for complete search history.

(56) References Cited

U.S. PATENT DOCUMENTS

| 5,862,325 | A  | * | 1/1999 | Reed et al. | 709/201 |
|---|---|---|---|---|---|
| 5,966,716 | A  | * | 10/1999 | Comer et al. | 707/203 |
| 6,151,608 | A  | * | 11/2000 | Abrams | 707/204 |
| 6,442,569 | B1 | * | 8/2002 | Crapo et al. | 707/201 |
| 6,626,959 | B1 | * | 9/2003 | Moise et al. | 715/522 |
| 6,631,497 | B1 | * | 10/2003 | Jamshidi et al. | 715/205 |
| 7,225,189 | B1 | * | 5/2007 | McCormack et al. | 707/10 |
| 7,233,956 | B2 | * | 6/2007 | Balducci et al. | 707/102 |
| 7,269,786 | B1 | * | 9/2007 | Malloy et al. | 715/503 |
| 7,275,053 | B1 | * | 9/2007 | Gardner et al. | 707/3 |
| 7,313,569 | B2 | * | 12/2007 | Steinmann et al. | 707/102 |
| 2001/0020237 | A1 | * | 9/2001 | Yarnall et al. | 707/4 |
| 2001/0034744 | A1 | * | 10/2001 | Honma et al. | 707/509 |
| 2002/0104022 | A1 | * | 8/2002 | Jorgenson | 713/201 |
| 2003/0061226 | A1 |   | 3/2003 | Bowman et al. | 707/100 |
| 2003/0110191 | A1 | * | 6/2003 | Handsaker et al. | 707/503 |
| 2003/0126139 | A1 | * | 7/2003 | Lee et al. | 707/100 |
| 2003/0182287 | A1 | * | 9/2003 | Parlanti | 707/10 |
| 2004/0143650 | A1 | * | 7/2004 | Wollowitz | 709/219 |
| 2004/0167870 | A1 | * | 8/2004 | Wakefield et al. | 707/1 |
| 2005/0165807 | A1 | * | 7/2005 | Srinivasan et al. | 707/100 |
| 2005/0187969 | A1 | * | 8/2005 | Chaudri | 707/103 R |
| 2005/0192841 | A1 | * | 9/2005 | Hays et al. | 705/2 |
| 2005/0267899 | A1 | * | 12/2005 | Gupta et al. | 707/100 |
| 2006/0116865 | A1 | * | 6/2006 | Cheng et al. | 704/2 |
| 2007/0136666 | A1 | * | 6/2007 | Khen et al. | 715/538 |
| 2007/0288506 | A1 | * | 12/2007 | Matson et al. | 707/102 |
| 2008/0126395 | A1 | * | 5/2008 | Marueli | 707/102 |

* cited by examiner

FOREIGN PATENT DOCUMENTS

WO  WO 2005/033980 A1  4/2005

*Primary Examiner*—John R. Cottingham
*Assistant Examiner*—Mohammed R Uddin
(74) *Attorney, Agent, or Firm*—Yee & Associates, P.C.; John R. Pivnichny

(57) ABSTRACT

One embodiment of the invention is directed to a method for transferring data from a specified spreadsheet, having a name, rows and columns, to a relational database table. The method includes the steps of receiving the spreadsheet at a given location, assigning a name to the relational database table that is derived from the spreadsheet name, and creating names for columns of the table from the contents of a first row of the spreadsheet. Data types for respective columns of the table are derived from the contents of a second row of the spreadsheet. After creation of the table, data is loaded into locations of the table from respectively corresponding cells of the specified spreadsheet.

6 Claims, 3 Drawing Sheets

METHOD AND APPARATUS FOR LOADING DATA FROM A SPREADSHEET TO A RELATIONAL DATABASE TABLE

BACKGROUND OF THE INVENTION

1. Field of the Invention

The invention disclosed and claimed herein generally pertains to a method and apparatus for loading or transferring data from a spreadsheet into a dynamically created table of a relational database. More particularly, the invention pertains to a method of the above type wherein the uploading or transfer of spreadsheet data is accompanied by security measures, to ensure that the transfer is authorized. In a useful embodiment, the invention pertains to a method of the above type wherein data transferred from a spreadsheet is selectively combined with other data, which was not previously contained in a spreadsheet.

2. Description of the Related Art

As is known by those of skill in the art, a relational database is a database wherein all data is stored in tables. By enumerating a table name, the names of table columns, and the data types of respective column contents, a table in a relational database is completely described. As an important advantage, queries in a table of a relational database depend on a comparison of the table contents. As a result, pointers are not required in such databases, and all relations are treated uniformly. Moreover, the tables are independent and not related by pointers. Accordingly, it is easy to maintain dynamic data sets in a relational database. As a further advantage, tables can be easily expanded by new columns, and it is easy to create user specific views therefrom.

As is further well known, a spreadsheet provides another important mechanism for storing and presenting data. A spreadsheet is especially useful for displaying financial, accounting or other data in rows and columns, wherein the spaces containing respective items of data are called cells. A spreadsheet may comprise a computer application program that simulates a physical spreadsheet by capturing, displaying and manipulating data arranged in rows and columns. Spreadsheets, in fact, represent one of the most common uses of personal computers. In many businesses spreadsheets are routinely used to graphically present financial data.

Notwithstanding the widespread use and popularity of spreadsheets, it is not easy at present to conveniently convert or transfer data from a spreadsheet format to a relational database table. Any such transfer must generally be carried out using a manual or other tedious procedure. As a result, the benefits of having data in a relational database, as described above, do not readily apply to data contained in spreadsheets. This situation makes it difficult to generate reports that, for example, combine financial data in a spreadsheet with non-financial data residing in a relational database table. It would thus clearly be beneficial to provide a mechanism or procedure for easily and automatically loading data from a spreadsheet to a relational database table. The loading procedure would usefully ensure that such procedure was applied only to spreadsheet data that was properly authorized or authenticated for loading.

SUMMARY OF THE INVENTION

The invention generally provides functionality for loading data from a spreadsheet into a dynamically created relational database table, based on conditions provided by a reference table or log. Different types of transmission means, such as E-mail, File Transfer Protocol (FTP) upload, and Internet web interface, may alternatively be used to send a spreadsheet to a location for processing, in accordance with the invention. Security measures are provided for each type of transmission, to ensure that processing is authorized for each spreadsheet received at the location. In one embodiment of the invention, a method is provided for transferring data from a specified spreadsheet having a name, as well as rows and columns, to a relational database table. The method includes the steps of receiving the spreadsheet at a given location, assigning a name to the relational database table that is derived from the spreadsheet name, and creating names for columns of the table from the contents of a first row of the spreadsheet. Data types for respective columns of the table are derived from the contents of a second row of the spreadsheet. After such dynamic creation of the table, data is loaded into locations of the table from respectively corresponding cells of the specified spreadsheet.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
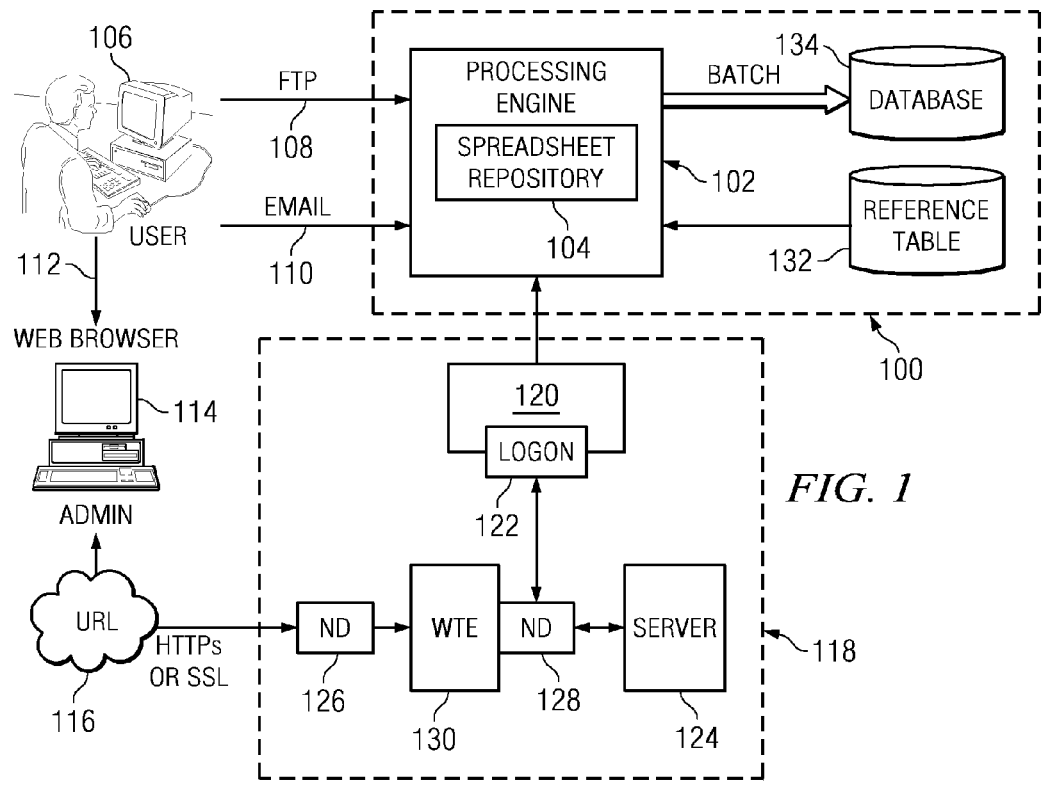
FIG. 1 is a block diagram that shows a processing system for implementing an embodiment of the invention, and further shows alternative transmission paths for sending a spreadsheet to the processing system.

Referring to FIG. 1, there is shown a processing system 100 configured to implement an embodiment of the invention, as described hereinafter in further detail. Processing system 100 could, for example, comprise the data processing system described in connection with FIG. 2. Processing system 100 includes a processor or processing engine 102 that contains a spreadsheet repository 104. FIG. 1 further shows a work station 106 that may be operated by a user to generate spreadsheets containing financial or other data. The spreadsheets can have commonly used formats, such as LOTUS 1-2-3® or EXCEL® formats, but the invention is by no means limited thereto. FIG. 1 illustrates alternative transmission links 108-112, any of which may be selected to upload spreadsheets from the work station 106 into processing engine 102. Spreadsheets received at processing engine 102 are loaded into spreadsheet repository 104.

Transmission link 108 illustrates FTP uploads of spreadsheet files. As is known by those of skill in the art, FTP enables a user to send large files via the Internet in a rapid and secure fashion. With FTP, a user is not limited by the size or type of files. Moreover, spreadsheet files can be uploaded directly to repository 104, using conventional FTP user authentication.

Transmission link 110 enables spreadsheet files to be uploaded by means of E-mail. Each file would be sent to the user identifier for the particular E-mail service being used for transmission link 110. For example, if Lotus Notes was the e-mail service, spreadsheet files would be sent to the Lotus Notes ID.

Referring further to FIG. 1, there is shown transmission link 112 coupled to a web browser 114. The administrator of browser 114 routes spreadsheet files received from work station 106 through Uniform Resource Locator (URL) 116 to a web site 118. Web site 118 has a web page 120 for uploading spreadsheet files to repository 104, wherein web page 120 is used with a logon component 122. Usefully, the web page is provided by JAVA® Server Pages (JSPs), in combination with a WEBSPHERE® software platform. The web page 120 requires authentication. Accordingly, spreadsheet files are transferred to repository 104 using the secure socket layer (SSL). SSL is a commonly used protocol for managing security of file transmissions.

The web site 118 shown by FIG. 1 further includes a server 124, NEWSEARCH DOMINO® (ND) applications 126 and 128, and a WEBSPHERE® Test Environment (WTE) component 130. In one useful embodiment, server 124 comprises IHS Cluster HTML.

FIG. 1 further shows processing system 100 provided with a reference table 132 and a database 134. The functions of these components are described hereinafter in further detail, in connection with FIG. 3.

Figure 2:
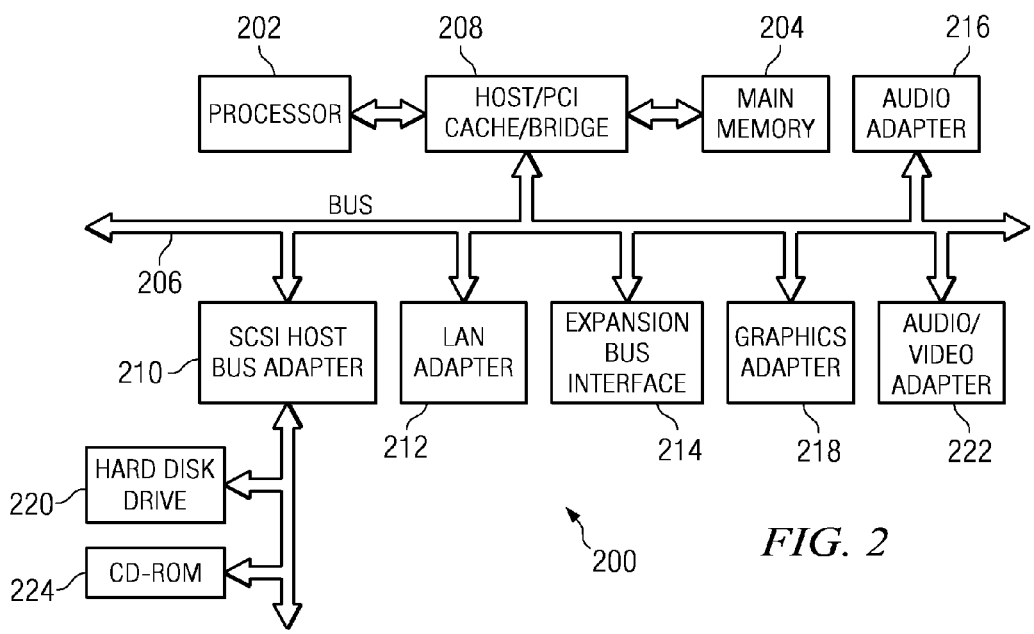
FIG. 2 is a block diagram showing a data processing system that may be used to implement respective components of the processing system shown in FIG. 1.

Referring to FIG. 2, there is shown a block diagram of a generalized data processing system 200 which may be used in implementing embodiments of the present invention. Data processing system 200 exemplifies a computer, in which code or instructions for implementing the processes of the present invention may be located. Data processing system 200 usefully employs a peripheral component interconnect (PCI) local bus architecture, although other bus architectures such as Accelerated Graphics Port (AGP) and Industry Standard Architecture (ISA) may alternatively be used. FIG. 2 shows a processor 202 and main memory 204 connected to a PCI local bus 206 through a Host/PCI bridge 208. PCI bridge 208 also may include an integrated memory controller and cache memory for processor 202.

Referring further to FIG. 2, there is shown a local area network (LAN) adapter 212, a small computer system interface (SCSI) host bus adapter 210, and an expansion bus interface 214 respectively connected to PCI local bus 206 by direct component connection. Audio adapter 216, a graphics adapter 218, and audio/video adapter 222 are connected to PCI local bus 206 by means of add-in boards inserted into expansion slots. SCSI host bus adapter 210 provides a connection for hard disk drive 220, and also for CD-ROM drive 224.

An operating system runs on processor 202 and is used to coordinate and provide control of various components within data processing system 200 shown in FIG. 2. The operating system may be a commercially available operating system such as WINDOWS XP®, which is available from MICROSOFT® Corporation. Instructions for the operating system and for applications or programs are located on storage devices, such as hard disk drive 220, and may be loaded into main memory 204 for execution by processor 202.

Figure 3:
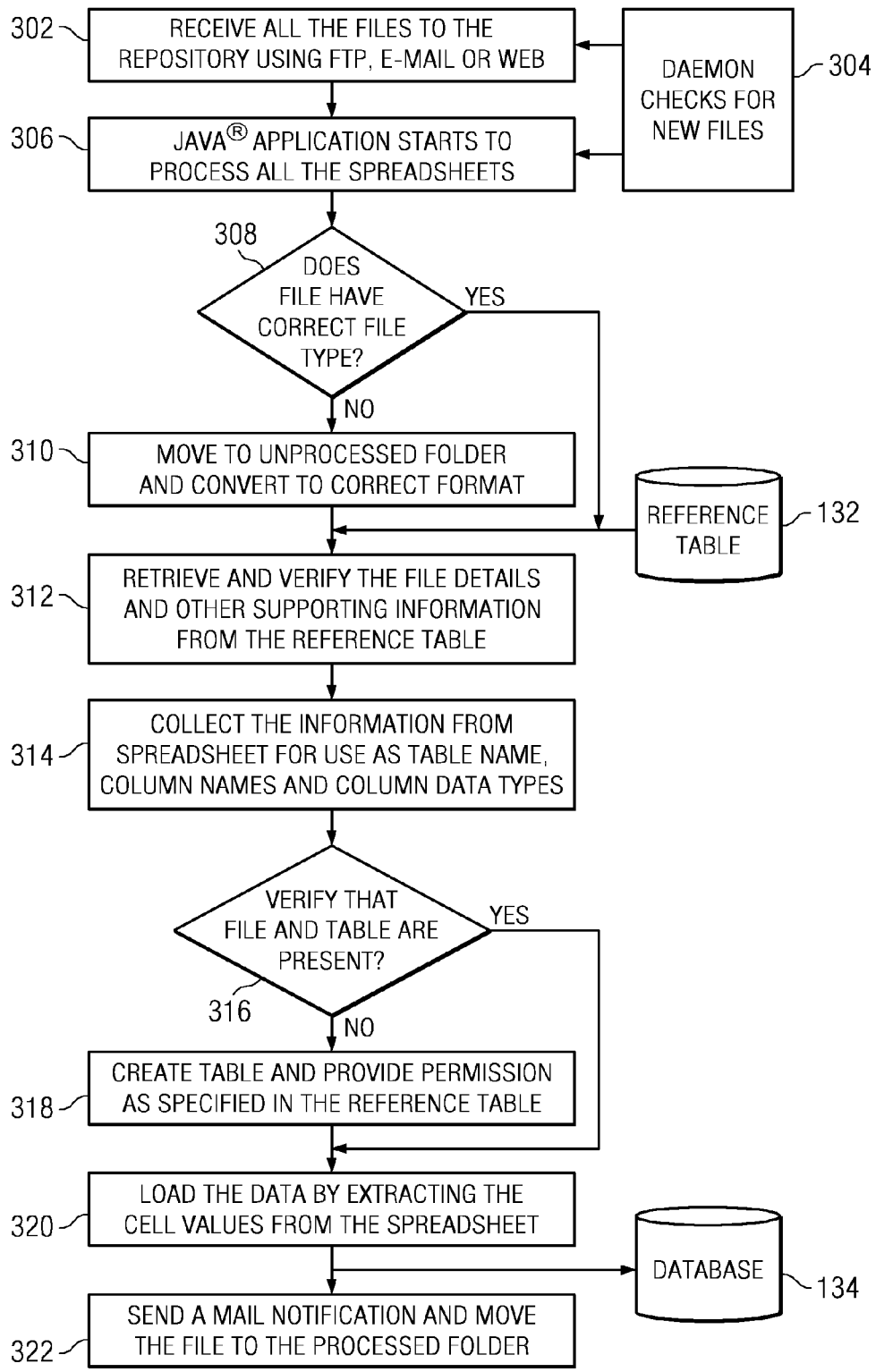
FIG. 3 is a flow chart illustrating respective steps of an embodiment of the invention.

Referring to FIG. 3, there is shown a flow chart depicting the respective steps of a method in accordance with an embodiment of the invention. Step 302 indicates that respective spreadsheet files are initially received at the spreadsheet repository 104. As described above in connection with FIG. 1, such files may be sent to the repository using either FTP, E-mail, such as LOTUS NOTES®, or a web page.

As shown by step 306, after spreadsheet files have been loaded into repository 104, processing engine 102 commences a software application to process the files. Usefully, a JAVA® application is selected for this purpose, but the invention is not limited thereto. The processing task is scheduled as part of a batch job that is run periodically, such as every five minutes. This is illustrated in FIG. 3 by step 304, which shows a daemon provided to periodically search the repository for newly arrived files. As is known, a daemon is a program that runs continuously and exists for the purpose of handling periodic service requests that a computer system expects to receive. After handling, the daemon forwards the requests to another program or application.

Processing engine 102 is intended to accommodate spreadsheets of a number of different formats, including EXCEL®, LOTUS 1-2-3®-, and others. At the same time, processing operations would generally be more efficient if all spreadsheets were of a single uniform file type. Accordingly, when processing of spreadsheets commences, step 308 shows that the file types of successive spreadsheet files are checked against a pre-selected correct file type. In one embodiment, Excel would be selected for the correct file type, but the invention is not limited thereto. If a spreadsheet is found to have a file type different from the pre-selected file type, it is moved to an unprocessed folder, as indicated by step 310. The spreadsheet may then be converted to the correct format and returned for further processing.

As the processing of a spreadsheet continues, certain necessary information is obtained from the spreadsheet. Such information includes the database name, database schema, Owner Notes ID, Notification Notes ID, database user name and database password. This information is used to authenticate the spreadsheet. Frequently, repository 104 will receive a series or sequence of spreadsheets that contain the same or related identity and authentication information. Accordingly, to reduce the required processing, reference table 132 is provided, to obtain the above identity and authentication information from the very first spreadsheet in the series. This information is then stored in reference table 132. Thereafter, as subsequent spreadsheets in the series are received, the stored authentication information is retrieved from reference table 132 for use therewith, as indicated by step 312 of FIG. 3.

At step 314, three elements of information are collected from each spreadsheet. These elements are required to construct a corresponding relational database table. More particularly, the collected elements are needed to provide the name of the table, the names of the table columns, and the table column data types. In accordance with the invention, the spreadsheet name will be used as the table name. The first row value collected from the spreadsheet will be used to create the table column names, and the second row of the spreadsheet will be used for the table column data types.

Referring further to FIG. 3, step 316 indicates that it is necessary to determine whether a relational database table is already present or available for a particular spreadsheet file. For example, a corresponding table could have been created for a previously received spreadsheet that was closely related to the particular spreadsheet. If there is a table present already, as shown by a "YES" output of step 316, the method of FIG. 3 proceeds to step 320.

If no table is present that corresponds to a received spreadsheet, a relational database table is created for the spreadsheet, as indicated by step 318. As described above, this is carried out by assigning the spreadsheet name as the name that is to be used for the table. Names for the columns of the table are created from the contents of a first row of the spreadsheet. The data types for respective columns of the table are derived from the contents of a second row of the spreadsheet. After the relational database table has been created, information in reference table 132 is queried, to confirm that the spreadsheet is permitted to load data to the table.

When a relational database table corresponding to a received spreadsheet is present or becomes available, data values are extracted from respective cells of the spreadsheet and loaded into the table, as shown by step 320. The relational database is retained in database 134, as also shown. After the loading of data has been completed, the spreadsheet file is moved to the processed folder and deleted from the repository 104. The owner and user of the spreadsheet file is notified of these events by E-mail, as indicated at step 322.

Figure 4:
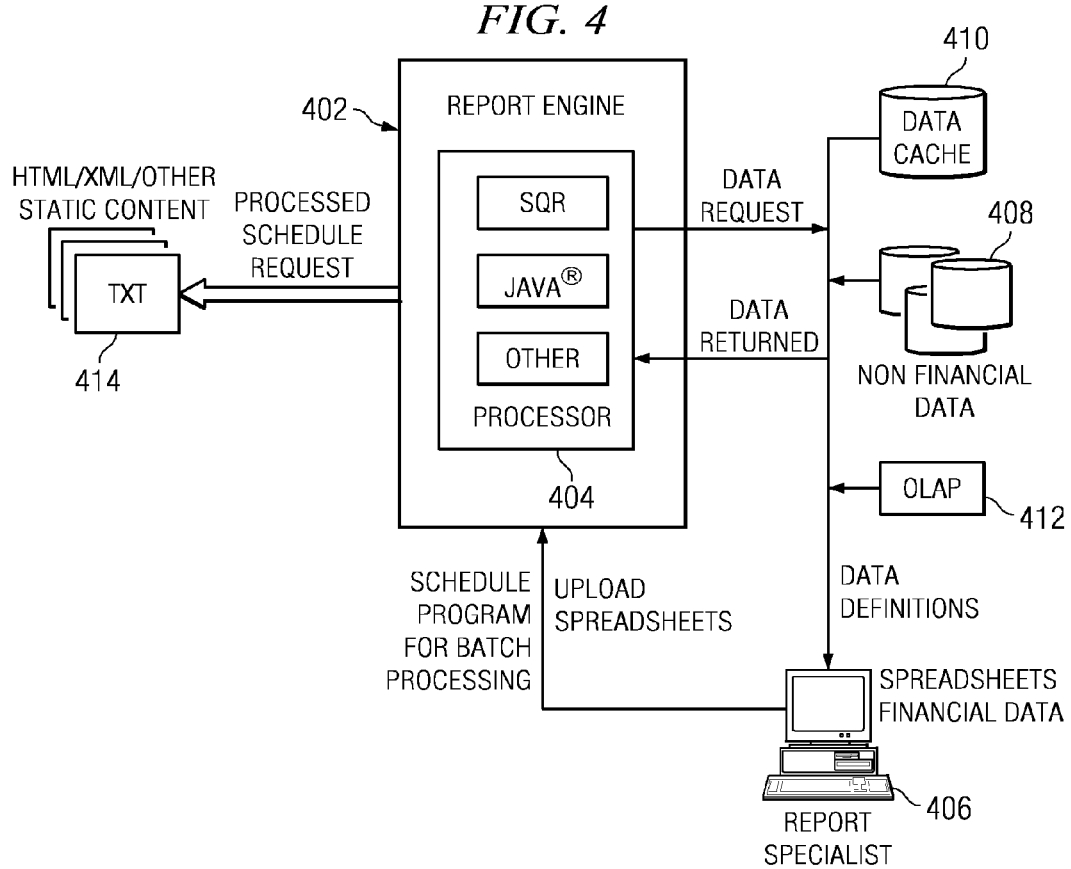
FIG. 4 is a block diagram showing a further embodiment of the invention.

Referring to FIG. 4, there is shown a report engine 402 provided with a processor 404. Processor 404 is adapted to implement standard query reports (SQR), JAVA® applications and other applications. Report engine 402 is configured to receive spreadsheets and to transfer data therefrom to relational database tables, in like manner with processing engine 102 described above. Moreover, report engine 402 is disposed to receive data in different formats from different sources, and to generate reports in which data from different sources may be combined. More particularly, report engine 402 receives spreadsheets containing financial data, wherein respective spreadsheets are generated by a report specialist at work station 406. Work station 406 additionally furnishes report engine 402 with schedules for batch processing of spreadsheets. Report engine 402 also receives non-financial data from a relational database 408 and from data cache 410.

Referring further to FIG. 4, there is shown an online applications processor (OLAP) 412 connected to send instructions to report engine 402. More specifically, OLAP 412 is able to direct report engine 402 to generate reports in which data from different sources may be combined, to provide various types of reports having different perspectives. Accordingly, report engine 402 is instructed to produce a report that is to include both non-financial data from database 408 and financial data from work station 406. Using an embodiment of the invention, this may be readily accomplished. As described above, report engine 402 transfers or uploads the data from involved spreadsheets to corresponding dynamically created relational database tables. The data in these tables can then be combined with data from relational database 408, in order to generate the report. The report may be in the form of HTML, XML, or other text files 414.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for transferring data from a specified spreadsheet having a name, rows and colunms to a relational database table, said method comprising the steps of:
   receiving said specified spreadsheet at a given location;
   assigning a name to said relational database table that is derived from said spreadsheet name;
   creating names for respective colunms of said table from the contents of a first row of said specified spreadsheet;
   deriving data types for respective colunms of said table from the contents of a second row of said specified spreadsheet; and
   loading data into locations of said table from respectively corresponding cells of said specified spreadsheet, wherein said data loaded into locations of said table is selectively combined in a document, at said given location where said specified spreadsheet has been received, with other information that has not been contained in a spreadsheet; and
   said transfer of data requires completion of an authentication procedure to affirm that said specified spreadsheet may be uploaded into a repository at said location that is associated with said relational database table, wherein said specified spreadsheet contains identification information for use in said authentication procedure.

2. The method of claim 1, wherein:
   said method includes the step of collecting said spreadsheet name and said contents of said first and second rows of said spreadsheet, after said specified spreadsheet has been uploaded into said repository, for use in constructing said relational database table.

3. The method of claim 1, wherein:
   information pertaining to said specified spreadsheet is stored in a reference table linked to said repository, for subsequent use in connection with spreadsheets uploaded into said repository after said specified spreadsheet has been uploaded thereinto.

4. The method of claim 1, wherein:

said specified spreadsheet is uploaded to said repository by using a transmission link selected from a group that includes at least transmission links using FTP, E-mail, and an Internet web page.

5. The method of claim 1, wherein:

said specified spreadsheet has a file type that is queried when said specified spreadsheet is uploaded into said repository; and if said file type is determined not to be a particular preselected file type, said specified spreadsheet is converted to said particular file type.

6. The method of claim 1, wherein:

after said step of loading data into locations of said table, E-mail notification is provided to the entity that sent said specified spreadsheet to said given location.

\* \* \* \* \*